(12) United States Patent
Isokawa

(10) Patent No.: US 9,948,803 B2
(45) Date of Patent: Apr. 17, 2018

(54) READING APPARATUS THAT SUPPRESSES HEIGHT OF RECORDING MEDIUM AT A READING POSITION, IMAGE FORMING APPARATUS AND IMAGE FORMING SYSTEM HAVING THE SAME

(71) Applicant: Konica Minolta, Inc., Chiyoda-ku, Tokyo (JP)

(72) Inventor: Hiroshi Isokawa, Hino (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/080,255

(22) Filed: Mar. 24, 2016

(65) Prior Publication Data
US 2016/0286063 A1    Sep. 29, 2016

(30) Foreign Application Priority Data

Mar. 26, 2015   (JP) ................................. 2015-064225

(51) Int. Cl.
*H04N 1/193*    (2006.01)
*H04N 1/00*     (2006.01)
(Continued)

(52) U.S. Cl.
CPC ..... *H04N 1/00602* (2013.01); *G03G 15/5062* (2013.01); *G03G 15/65* (2013.01);
(Continued)

(58) Field of Classification Search
USPC ...... 358/1.12, 486, 488, 492, 493, 497, 498, 358/296
See application file for complete search history.

(56) References Cited

U.S. PATENT DOCUMENTS

2007/0009296 A1    1/2007  Shoji
2008/0100886 A1    5/2008  Kobayashi
(Continued)

FOREIGN PATENT DOCUMENTS

JP    11-69044 A    3/1999
JP    2005-1829 A   1/2005
(Continued)

OTHER PUBLICATIONS

The extended European Search dated Jul. 29, 2016, by the European Patent Office in corresponding European Patent Application No. 16161028.2-1568. (9 pages).
(Continued)

*Primary Examiner* — Marcellus Augustin
(74) *Attorney, Agent, or Firm* — Buchanan Ingersoll & Rooney PC

(57) ABSTRACT

A reading apparatus which is connected to an image forming apparatus that forms an image on a recording medium, the reading apparatus including: a supporting section which forms a reading surface for reading the image on the recording medium by contacting the recording medium on which the image is formed by the image forming apparatus; a conveyance section which conveys the recording medium so that the recording medium contacts the supporting section from a leading direction at a predetermined leading angle with respect to the reading surface and moves apart from the supporting section to an ejection direction at a predetermined ejection angle with respect to the reading surface; and a reading section which reads the image on the recording medium at a position where the reading surface is formed.

19 Claims, 6 Drawing Sheets

(51) Int. Cl.
*G03G 15/00* (2006.01)
*H04N 1/028* (2006.01)

(52) U.S. Cl.
CPC ..... *G03G 15/6573* (2013.01); *H04N 1/00631* (2013.01); *H04N 1/00795* (2013.01); *H04N 1/02825* (2013.01); *G03G 2221/1696* (2013.01); *H04N 1/0079* (2013.01); *H04N 1/00615* (2013.01)

(56) References Cited

U.S. PATENT DOCUMENTS

| | | | | |
|---|---|---|---|---|
| 2010/0109226 | A1* | 5/2010 | Kitazawa | B65H 5/24 |
| | | | | 271/3.14 |
| 2012/0119432 | A1* | 5/2012 | Kambayashi | B65H 3/0607 |
| | | | | 271/10.02 |
| 2012/0250109 | A1* | 10/2012 | Harada | H04N 1/2032 |
| | | | | 358/475 |
| 2013/0003145 | A1* | 1/2013 | Osakabe | H04N 1/203 |
| | | | | 358/497 |

FOREIGN PATENT DOCUMENTS

| | | |
|---|---|---|
| JP | 2012-94939 A | 5/2012 |
| JP | 2012-165246 A | 8/2012 |

OTHER PUBLICATIONS

Office Action (Notification of Reasons for Refusal) dated May 16, 2017 by the Japanese Patent Office in corresponding Japanese Patent Application No. 2015-064225, and an English translation of the Office Action. (9 pgs).

\* cited by examiner

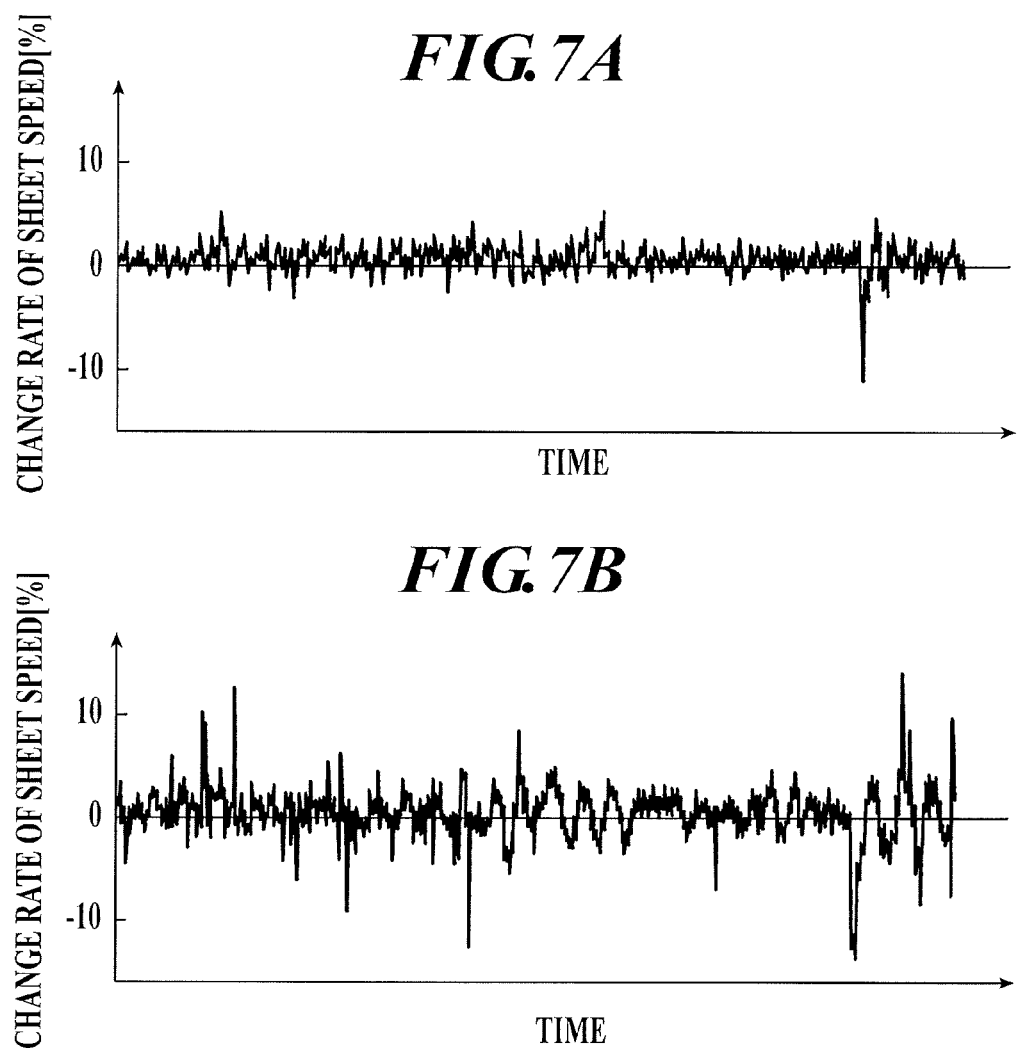

READING APPARATUS THAT SUPPRESSES HEIGHT OF RECORDING MEDIUM AT A READING POSITION, IMAGE FORMING APPARATUS AND IMAGE FORMING SYSTEM HAVING THE SAME

BACKGROUND OF THE INVENTION

1. Field of the Invention

The present invention relates to a reading apparatus, an image forming apparatus and an image forming system.

2. Description of Related Art

Conventionally, there have been known image forming systems including electrophotographic image forming apparatuses and reading apparatuses, the electrophotographic image forming apparatuses providing toners to recording media such as sheets of paper and fixing the toners by heating or pressurizing the recording media to form images, and the reading apparatuses reading the images that were formed on the recording media by the image forming apparatuses. In such image forming systems, the image forming apparatuses form predetermined identification marks indicating the position, density and such like of images on recording media, the reading apparatuses read the predetermined identification marks formed on the recording media, and the reading results are analyzed to determine whether the image forming apparatuses are performing image formation appropriately.

Such image forming systems are provided with conveyance apparatuses which have conveyance rollers for conveying recording media on the upstream side and the downstream side in conveyance direction of reading positions by the reading apparatuses. Reading by the reading apparatuses is performed while conveying the recording media in a predetermined conveyance direction with the conveyance apparatuses. In order to suppress the load on the recording media, reading by the reading apparatuses is generally performed while conveying the recording media so as not to curve on conveyance paths which are linear when seen from the width direction orthogonal to the conveyance direction of the recording media (for example, see Japanese Patent Application Laid Open Publication No. 2012-94939).

However, the recording media on which images are formed have warpage and waviness caused by heat, pressure and such like which are applied to the recording media when the images are fixed. Thus, conventional image forming systems using linear conveyance paths have had a problem that reading cannot be performed appropriately since the heights of recording media at the reading positions by the reading apparatuses are changed due to the warpage and waviness. In addition, when the recording media are conveyed in the reading apparatus, the conveyance speeds by the conveyance rollers are also changed in some cases due to the variation in outside diameter of conveyance rollers and the change in outside diameter caused by the temperature change. Conventional image forming systems have had a problem that reading cannot be performed appropriately since the recording media become slack and the heights of recording media are changed at the reading positions by the reading apparatuses when the conveyance speeds of recording media on the upstream side of the reading positions by the reading apparatuses are relatively increased with respect to the conveyance speeds on the downstream side.

SUMMARY OF THE INVENTION

An object of the present invention is to provide a reading apparatus, an image forming apparatus and an image forming system which can suppress the change in height of a recording medium at a reading position.

In order to achieve the above object, according to one aspect of the present invention, there is provided a reading apparatus which is connected to an image forming apparatus that forms an image on a recording medium, the reading apparatus including: a supporting section which forms a reading surface for reading the image on the recording medium by contacting the recording medium on which the image is formed by the image forming apparatus; a conveyance section which conveys the recording medium so that the recording medium contacts the supporting section from a leading direction at a predetermined leading angle with respect to the reading surface and moves apart from the supporting section to an ejection direction at a predetermined ejection angle with respect to the reading surface; and a reading section which reads the image on the recording medium at a position where the reading surface is formed.

Preferably, in the reading apparatus, the reading section reads a surface of the recording medium, the surface being opposite to a surface which is in contact with the supporting section.

Preferably, in the reading apparatus, the conveyance section includes: a first conveyance roller which conveys the recoding medium to the supporting section from the leading direction; and a second conveyance roller which conveys the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

Preferably, in the reading apparatus, the supporting section includes: a first supporting section which supports one surface of the recording medium; and a second supporting section which is disposed on a downstream side of the first supporting section in a conveyance direction of the recording medium by the conveyance section and supports the other surface of the recording medium, the reading section includes: a first reading section which reads the other surface of the recording medium, the recording medium being supported by the first supporting section; and a second reading section which reads the one surface of the recording medium, the recording medium being supported by the second supporting section, and the conveyance section includes: a first conveyance roller which conveys the recording medium to the first supporting section from a first leading direction; a second conveyance roller which conveys the recording medium from the first supporting section to a first ejection direction and conveys the recording medium to the second supporting section from a second leading direction; and a third conveyance roller which conveys the recording medium from the second supporting section to a second ejection direction.

Preferably, in the reading apparatus, setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

Preferably, in the reading apparatus, the first reading section includes: a first light source which emits light to the other surface of the recording medium, the recording medium being supported by the first supporting section; and a first light receiving section which receives reflected light at the recording medium of light emitted from the first light source, the second reading section includes: a second light source which emits light to the one surface of the recording medium, the recording medium being supported by the second supporting section; and a second light receiving section which receives reflected light at the recording medium of light emitted from the second light source, the first supporting section and the second supporting section are disposed on opposite sides of a predetermined reference plane which is parallel to the first reading surface according to the first supporting section and parallel to the second reading surface according to the second supporting section, the first light source emits light from a position on a first supporting section side of the reference plane, and the second light source emits light from a position on a second supporting section side of the reference plane.

In order to achieve the above object, according to another aspect of the present invention, there is provided an image forming apparatus, including: an image forming section which forms an image on a recording medium; a supporting section which forms a reading surface for reading the image on the recording medium by contacting the recording medium on which the image is formed by the image forming section; a conveyance section which conveys the recording medium so that the recording medium contacts the supporting section from a leading direction at a predetermined leading angle with respect to the reading surface and moves apart from the supporting section to an ejection direction at a predetermined ejection angle with respect to the reading surface; and a reading section which reads the image on the recording medium at a position where the reading surface is formed.

Preferably, in the image forming apparatus, the reading section reads a surface of the recording medium, the surface being opposite to a surface which is in contact with the supporting section.

Preferably, in the image forming apparatus, the conveyance section includes: a first conveyance roller which conveys the recoding medium to the supporting section from the leading direction; and a second conveyance roller which conveys the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

Preferably, in the image forming apparatus, the supporting section includes: a first supporting section which supports one surface of the recording medium; and a second supporting section which is disposed on a downstream side of the first supporting section in a conveyance direction of the recording medium by the conveyance section and supports the other surface of the recording medium, the reading section includes: a first reading section which reads the other surface of the recording medium, the recording medium being supported by the first supporting section; and a second reading section which reads the one surface of the recording medium, the recording medium being supported by the second supporting section, and the conveyance section includes: a first conveyance roller which conveys the recording medium to the first supporting section from a first leading direction; a second conveyance roller which conveys the recording medium from the first supporting section to a first ejection direction and conveys the recording medium to the second supporting section from a second leading direction; and a third conveyance roller which conveys the recording medium from the second supporting section to a second ejection direction.

Preferably, in the image forming apparatus, setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

Preferably, in the image forming apparatus, the first reading section includes: a first light source which emits light to the other surface of the recording medium, the recording medium being supported by the first supporting section; and a first light receiving section which receives reflected light at the recording medium of light emitted from the first light source, the second reading section includes: a second light source which emits light to the one surface of the recording medium, the recording medium being supported by the second supporting section; and a second light receiving section which receives reflected light at the recording medium of light emitted from the second light source, the first supporting section and the second supporting section are disposed on opposite sides of a predetermined reference plane which is parallel to the first reading surface according to the first supporting section and parallel to the second reading surface according to the second supporting section, the first light source emits light from a position on a first supporting section side of the reference plane, and the second light source emits light from a position on a second supporting section side of the reference plane.

In order to achieve the above object, according to another aspect of the present invention, there is provided an image forming system, including: an image forming apparatus which forms an image on a recording medium; and a reading apparatus which reads the image formed on the recording medium, wherein the reading apparatus includes: a supporting section which forms a reading surface for reading the image on the recording medium by contacting the recording medium on which the image is formed by the image forming apparatus; a conveyance section which conveys the recording medium so that the recording medium contacts the supporting section from a leading direction at a predetermined leading angle with respect to the reading surface and moves apart from the supporting section to an ejection direction at a predetermined ejection angle with respect to the reading surface; and a reading section which reads the image on the recording medium at a position where the reading surface is formed.

Preferably, in the image forming system, the reading section reads a surface of the recording medium, the surface being opposite to a surface which is in contact with the supporting section.

Preferably, in the image forming system, the conveyance section includes: a first conveyance roller which conveys the recoding medium to the supporting section from the leading direction; and a second conveyance roller which conveys the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

Preferably, in the image forming system, the supporting section includes: a first supporting section which supports one surface of the recording medium; and a second supporting section which is disposed on a downstream side of the first supporting section in a conveyance direction of the recording medium by the conveyance section and supports the other surface of the recording medium, the reading section includes: a first reading section which reads the other surface of the recording medium, the recording medium being supported by the first supporting section; and a second reading section which reads the one surface of the recording medium, the recording medium being supported by the second supporting section, and the conveyance section includes: a first conveyance roller which conveys the recording medium to the first supporting section from a first leading direction; a second conveyance roller which conveys the recording medium from the first supporting section to a first ejection direction and conveys the recording medium to the second supporting section from a second leading direction; and a third conveyance roller which conveys the recording medium from the second supporting section to a second ejection direction.

Preferably, in the image forming system, setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

Preferably, in the image forming system, the first reading section includes: a first light source which emits light to the other surface of the recording medium, the recording medium being supported by the first supporting section; and a first light receiving section which receives reflected light at the recording medium of light emitted from the first light source, the second reading section includes: a second light source which emits light to the one surface of the recording medium, the recording medium being supported by the second supporting section; and a second light receiving section which receives reflected light at the recording medium of light emitted from the second light source, the first supporting section and the second supporting section are disposed on opposite sides of a predetermined reference plane which is parallel to the first reading surface according to the first supporting section and parallel to the second reading surface according to the second supporting section, the first light source emits light from a position on a first supporting section side of the reference plane, and the second light source emits light from a position on a second supporting section side of the reference plane.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7A is a view showing a measurement result of change in sheet speed in an experiment 2;

FIG. 7B is a view showing a measurement result of change in sheet speed in a comparative experiment 2.

DETAILED DESCRIPTION OF THE PREFERRED EMBODIMENT

Hereinafter, a reading apparatus, an image forming apparatus and an image forming system according to an embodiment of the present invention will be described with reference to the drawings.

According to the embodiment, it is possible to suppress the change in height of the recording medium at the reading position.

Figure 1:
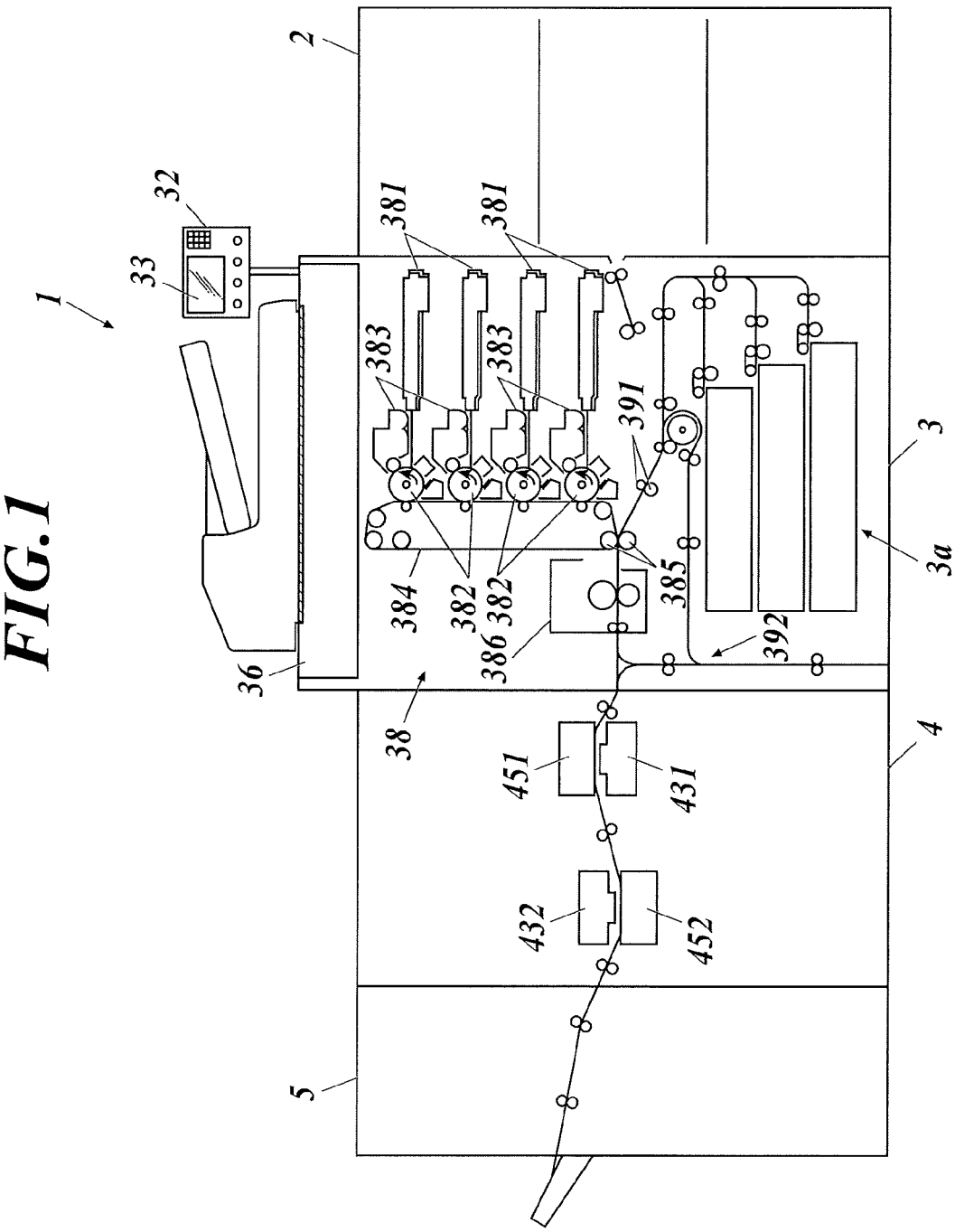
FIG. 1 is a view showing a schematic configuration of an image forming system.

FIG. 1 is a view showing a schematic configuration of an image forming system 1 in an embodiment of the present invention.

The image forming system 1 includes a paper feeding apparatus 2, an image forming apparatus 3, a reading apparatus 4 and a post-processing apparatus 5.

The paper feeding apparatus 2 includes a plurality of sheet accumulation sections of large capacity for accumulating many sheets (flat paper) as recording media, and conveys a sheet to the image forming apparatus 3 from a sheet accumulation section instructed by the image forming apparatus 3.

The image forming apparatus 3 forms an image on the sheet by an electrophotographic method. The image forming apparatus 3 conveys the sheet having the image formed thereon to the reading apparatus 4.

The reading apparatus 4 reads the image formed on the sheet which was conveyed from the image forming apparatus 3. The reading apparatus 4 conveys the sheet, for which the image reading was performed, to the post-processing apparatus 5. The reading apparatus 4 is configured to be attachable to and detachable from the image forming apparatus 3.

The post-processing apparatus 5 performs predetermined post-processing to the sheet conveyed from the reading apparatus 4 and ejects the sheet. The post-processing includes stapling, punching, folding and bookbinding, for example.

Each of the paper feeding apparatus 2, the image forming apparatus 3, the reading apparatus 4 and the post-processing apparatus 5 is configured to be attachable to and detachable from adjacent apparatuses.

Figure 2:
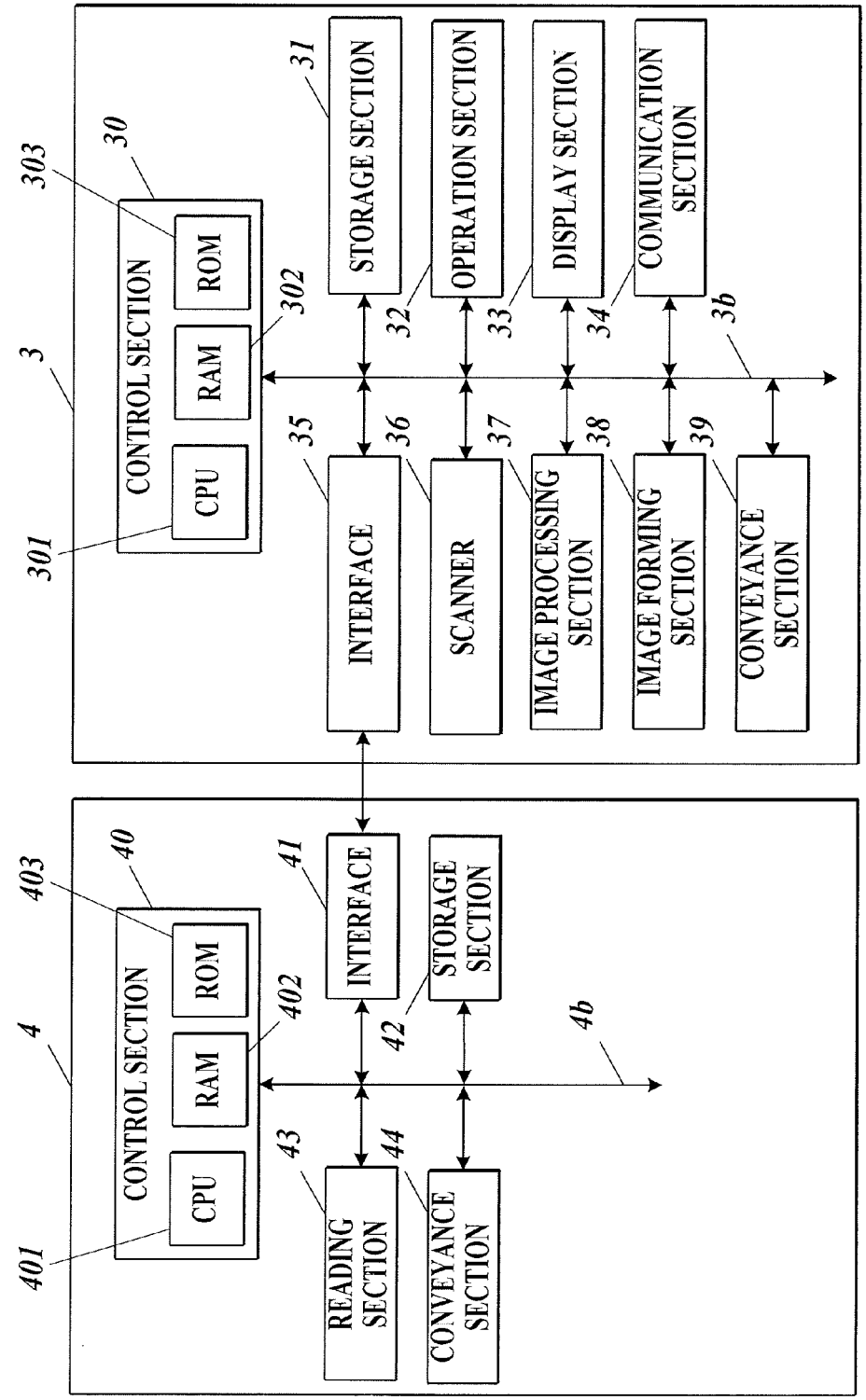
FIG. 2 is a block diagram showing a main functional structure of an image forming apparatus and a reading apparatus.

FIG. 2 is a block diagram showing a main functional configuration of the image forming apparatus 3 and the reading apparatus 4.

The image forming apparatus 3 includes: a control section 30 having a CPU 301 (Central Processing Section), a RAM 302 (Random Access Memory) and a ROM 303 (Read Only Memory); a storage section 31; an operation section 32; a display section 33; a communication section 34; an interface 35; a scanner 36; an image processing section 37; an image forming section 38; and a conveyance section 39. The control section 30 is connected to the storage section 31, the operation section 32, the display section 33, the communication section 34, the interface 35, the scanner 36, the image processing section 37, the image forming section 38 and the conveyance section 39 via a bus 3b.

The CPU 301 reads out and executes a control program stored in the ROM 303 or the storage section 31, and performs various types of arithmetic processing.

The RAM 302 provides working memory space to the CPU 301, and stores temporal data.

The ROM 303 stores various control programs to be executed by the CPU 301, set data and such like. The ROM 303 may be replaced with a non-volatile memory such as an EEPROM (Electrically Erasable Programmable Read Only Memory) and a flash memory, which is rewritable.

The control section 30 including the CPU 301, the RAM 302 and the ROM 303 integrally controls the sections of the image forming apparatus 3 in accordance with the above-mentioned various control programs. For example, the control section 30 controls the image processing section 37 to perform predetermined image processing to image data and stores the processed data in the storage section 31. The control section 30 controls the conveyance section 39 to convey a sheet and controls the image forming section 38 to form an image on the sheet on the basis of the image data stored in the storage section 31.

The storage section 31 is formed of a DRAM (Dynamic Random Access Memory) and such like, and stores image data obtained by the scanner 36, image data input from outside via the communication section 34, and such like. The image data and such like may be stored in the RAM 302.

The operation section 32 includes an input device such as operation keys and a touch panel disposed so as to be superposed on a screen of display section 33. The operation section 32 converts the input operation performed to the input device into an operation signal and outputs the signal to the control section 30.

The display section 33 includes a display device such as an LCD (Liquid Crystal Display), and displays the state of image forming system 1, an operation screen showing the contents of input operation to the touch panel, and such like.

In accordance with the control signal from the control section 30, the communication section 34 performs communication with a computer on a network and other image forming apparatuses, and transmits/receives image data and such like.

The interface 35 transmits and receives data to and from the reading apparatus 4, and is configured of any one of various serial interfaces, for example.

The scanner 36 reads the image formed on the sheet, generates image data including monochromatic image data for each color component of R (red), G (green) and B (blue), and stores the image data in the storage section 31.

The image processing section 37 includes a rasterizing section, a color conversion section, a tone correction section and a halftone processing section, performs various types of image processing to the image data stored in the storage section 31 and stores the processed data in the storage section 31.

The rasterizing section converts vector image data, which is described in a predetermined page description language (PDL) input from a computer or the like on a network, into raster image data such as bitmap. The image data which was converted and generated by the rasterizing section includes monochromatic image data for each color component of C (cyan), M (magenta), Y (yellow) and K (black).

The color conversion section performs color conversion of image data for each color of R, G and B output from the scanner 36 by referring to a predetermined lookup table, and generates image data including the monochromatic image data of each color of C, M, Y and K. The color conversion section also performs predetermined color correction processing to the image data.

The tone correction section corrects tone values of image data by referring to a lookup table determining correction values corresponding to respective tone values so that the gradation property of the image according to the image data is a predetermined property.

The halftone processing section performs halftone processing such as screen processing using dithering matrix and error diffusion with respect to the image data.

Apart or all of the rasterizing section, color conversion section, tone correction section and halftone processing section included in the image processing section 37 may be achieved by the control section 30, or may be achieved by another image processing apparatus provided outside the image forming apparatus 3.

The image forming section 38 forms an image on the sheet on the basis of the image data stored in the storage section 31. The image forming section 38 includes four sets of exposure section 381, photoreceptor 382 and developing section 383 corresponding to respective color components of C, M, Y and K. The image forming section 38 also includes a transfer body 384, secondary transfer rollers 385 and a fixing section 386.

The exposure section 381 includes an LD (Laser Diode) as a light emitting element. The exposure section 381 drives the LD on the basis of the image data, emits laser beams onto the charged photoreceptor 382 and performs exposure to form an electrostatic latent image on the photoreceptor 382. The developing section 383 supplies the toner (color material) of a predetermined color (one of C, M, Y and K) onto the exposed photoreceptor 382 with the charged developing roller and develops the electrostatic latent image formed on the photoreceptor 382.

The images (monochromatic images) that were formed on the four photoreceptors 382 respectively corresponding to C, M, Y and K with the respective toners of C, M, Y and K are sequentially superposed on the transfer body 384 to be transferred from the respective photoreceptors 382. Thereby, a color image having color components of C, M, Y and K is formed on the transfer body 384. The transfer body 384 is an endless belt wound by a plurality of conveyance rollers, and is rotated in accordance with rotations of respective conveyance rollers.

The secondary transfer rollers 385 transfer the color image on the transfer body 384 onto the sheet which was fed from the paper feeding apparatus 2 or the paper feeding tray 3*a*.

The fixing section 386 performs fixing processing for fixing the toners onto the sheet by heating and pressurizing the sheet on which the image is transferred. The fixing section 386 includes a pair of rollers which are a heating roller and a pressurizing roller, the rollers sandwiching the sheet therebetween. The heating roller is heated to a predetermined target temperature (for example, temperature within a range of 180° C. or more to 200° C. or less) by a heater as a source of heat. The pressurizing roller is forced toward the heating roller by an elastic member not shown in the drawings. The sheet, on which the image formed with toners is transferred by the secondary transfer roller 385, passes through a nip section between the heating roller and the pressurizing roller, and thereby, the image formed with toners is fixed onto the sheet.

The conveyance section 39 includes a plurality of conveyance rollers which conveys the sheet by rotating while sandwiching the sheet, and conveys the sheet along a predetermined conveyance path. The conveyance section 39 includes resist rollers 391 disposed upstream in the conveyance direction of the secondary transfer rollers 385. The resist rollers 391 once stop the conveyance of fed sheet and adjust the timing of sending the sheet to the secondary transfer rollers 385. The conveyance section 39 also includes a reversing mechanism 392 which reverses the front and back surfaces of sheet fixed by the fixing section 386 and conveys the sheet to the secondary transfer rollers 385. In the image forming apparatus 3, in a case where the image is to be formed on the both surfaces of the sheet, the front and back surfaces of the sheet are reversed by the reversing mechanism 392. In a case where the image is to be formed on only one surface of the sheet, the sheet is conveyed to the reading apparatus 4 without reversing the front and back surfaces of the sheet with the reversing mechanism 392.

The reading apparatus 4 includes: a control section 40 having a CPU 401, a RAM 402 and a ROM 403; an interface 41; a storage section 42; a reading section 43; and a conveyance section 44. The control section 40 is connected to the interface 41, the storage section 42, the reading section 43 and the conveyance section 44 via a bus 4*b*.

The CPU 401 reads out and executes control programs stored in the ROM 403 or the storage section 42, and performs various types of arithmetic processing.

The RAM 402 provides working memory space to the CPU 401 and stores temporal data. The temporal data includes a setting value according to a rotation speed of after-mentioned conveyance rollers 441, 442 and 443, for example.

The ROM 403 stores various control programs to be executed by the CPU 401, set data and such like. A rewritable nonvolatile memory such as an EEPROM and a flash memory may be used instead of the ROM 403.

The control section 40 including the CPU 401, the RAM 402 and the ROM 403 integrally controls the sections of reading apparatus 4 in accordance with the above-mentioned various control programs. For example, the control section 40 controls the reading section 43 to read the image formed on the sheet.

The interface 41 transmits and receives data to and from the image forming apparatus 3, and is formed of any one of various serial interfaces, for example.

The storage section 42 is formed of DRAM (Dynamic Random Access Memory) and such like, and stores image data (imaging data) acquired by the reading section 43. The image data may be stored in the RAM 402.

The reading section 43 includes: a first reading section 431 (reading section) which reads the back surface of the sheet having the front surface supported by a first supporting section 451 (supporting section); and a second reading section 432 (reading section) which reads the front surface of the sheet having the back surface supported by a second supporting section 452 (supporting section). Hereinafter, the first supporting section 451 and the second supporting section 452 are collectively described as a supporting section 45.

The conveyance section 44 conveys the sheet received from the image forming apparatus 3 in a predetermined conveyance direction. The conveyance section 44 includes first conveyance rollers 441 (conveyance rollers) which are disposed upstream in the conveyance direction of the reading section 431, second conveyance rollers 442 (conveyance rollers) which are disposed downstream of the first reading section 431 and upstream of the second reading section 432, and third conveyance rollers 443 (conveyance rollers) which are disposed downstream of the second reading section 432. Each of the first conveyance rollers 441, second conveyance rollers 442 and third conveyance rollers 443 are formed as a pair of rollers, and convey the sheet by rotating while sandwiching the sheet in the nip section of the pair of rollers.

Figure 3:
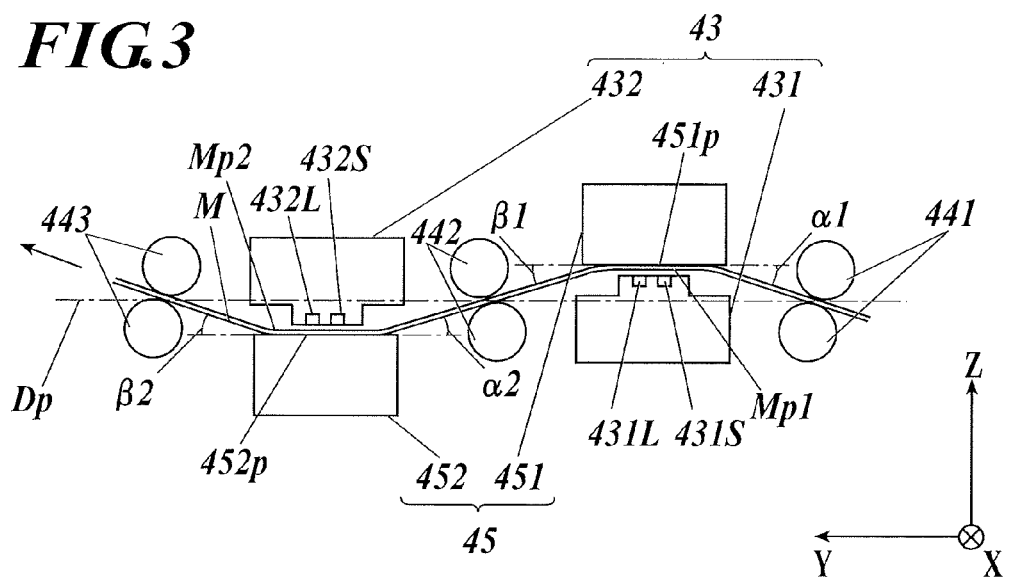
FIGS. 3 is a schematic view showing the configuration of a reading section, a conveyance section and a supporting section.

FIG. 3 is a schematic view showing the configuration of the reading section 43, conveyance section 44 and supporting section 45.

The first supporting section 451 and the second supporting section 452 are members which respectively include a first supporting surface 451*p* and a second supporting surface 452*p* for supporting the sheet M by a flat surface. When the sheet M is supported by the first supporting surface 451*p* or the second supporting surface 452*p*, a part of the sheet M respectively forms a first reading surface Mp1 or a second reading surface Mp2. In the embodiment, the first and second supporting surfaces 451*p* and 452*p* and the first and second reading surfaces Mp1 and Mp2 are flat surfaces which are parallel to each other. Hereinafter, the direction orthogonal to the flat surfaces is referred to as a Z direction. The width of each of the first and second supporting surfaces 451*p* and 452*p* in the direction (X direction) orthogonal to the drawing in FIG. 3 is larger than the width of sheet M in the X direction. Each of the first and second supporting sections 451 and 452 is configured by including a material such as metal of aluminum or the like and resin having high hardness, the material having hardness which does not generate deformation when contacting the sheet M and allowing the sheet M to smoothly slide on the first and second supporting surfaces 451*p* and 452*p*.

The first and second supporting sections 451 and 452 are disposed on sides opposite to each other with respect to a reference plane Dp which is parallel to the first and second supporting surfaces 451*p* and 452*p* shown in FIG. 3. That is, the first supporting section 451 is disposed on +Z direction side of the reference plane Dp (upper side in FIG. 3), and the second supporting section 452 is disposed on −Z direction side of the reference plane Dp (lower side in FIG. 3).

The first and second supporting sections 451 and 452 respectively have a shape ensuring a space for the sheet M to change the position in ±Z direction near the both ends of the first and second reading surfaces Mp1 and Mp2, respectively.

The first, second and third conveyance rollers 441, 442 and 443 convey the sheet M in the conveyance direction having a Y direction component which is orthogonal to the X direction and the Z direction in FIG. 3. The first and second conveyance rollers 441 and 442 are disposed so that the nip section of each of the first and second conveyance rollers 441 and 442 is located on the opposite side to the first supporting section 451 with respect to the first reading surface Mp1. The second and third conveyance rollers 442 and 443 are disposed so that the nip section of each of the second and third conveyance rollers 442 and 443 is located on the opposite side to the second supporting section 452 with respect to the second reading surface Mp2.

The first conveyance rollers 441 make the sheet M contact the first supporting surface 451p by conveying the sheet M to the first supporting section 451 from a leading direction (first leading direction) which is at a leading angle α1 toward a side opposite to the first supporting section 451 with respect to the first reading surface Mp1. The second conveyance rollers 442 make the sheet M apart from the first supporting section 451 by conveying the sheet M to an ejection direction (first ejection direction) which is at an ejection angle β1 toward an opposite side to the first supporting section 451 with respect to the first reading surface Mp1. The first and second conveyance rollers 441 and 442 convey the sheet M on the first supporting section 451 in such manner that the sheet M forms the first reading surface Mp1 on the first supporting surface 451p between the position where the sheet M contacts the first supporting surface 451p and the position where the sheet M moves away from the first supporting surface 451p.

The second conveyance rollers 442 also make the sheet M contact the second supporting surface 452p by conveying the sheet M to the second supporting section 452 from a leading direction (second leading direction) which is at a leading angle α2 toward an opposite side to the second supporting section 452 with respect to the second reading surface Mp2. The third conveyance rollers 443 make the sheet M apart from the second supporting section 452 by conveying the sheet M to an ejection direction (second ejection direction) which is at an ejection angle p2 toward an opposite side to the second supporting section 452 with respect to the second reading surface Mp2. The second and third conveyance rollers 442 and 443 convey the sheet M on the second supporting section 452 in such manner that the sheet M forms the second reading surface Mp2 on the second supporting surface 452p between the position where the sheet M contacts the second supporting surface 452p and the position where the sheet M moves away from the second supporting surface 452p.

A guide member (not shown in the drawings) is provided between the first supporting section 451 and each of the first and second conveyance rollers 441 and 442, and provided between the second supporting section 452 and each of the second and third conveyance rollers 442 and 443, the guide member preventing the sheet M from deviating from the conveyance path. The guide member has a position and a shape ensuring space for the sheet M to change the position in ±Z direction near both ends of each of the first and second reading surfaces Mp1 and Mp2.

In the embodiment, the first, second and third conveyance rollers 441, 442 and 443 and the first and second supporting members 451 and 452 are disposed so that all the values of leading angles α1 and α2 and ejection angles β1 and β2 are equal to each other. The first and second conveyance rollers 441 and 442 and the first supporting section 451 are disposed so that the line forms a trapezoid when seen from the X direction in FIG. 3, the line connecting the both ends in conveyance direction of the first reading surface Mp1 and the nip sections of the first and second conveyance rollers 441 and 442. Similarly, the second and third conveyance rollers 442 and 443 and the second supporting section 452 are disposed so that the line connecting the both ends in conveyance direction of the second reading surface Mp2 and the nip sections of the second and third conveyance rollers 442 and 443 forms a trapezoid when seen from the X direction in FIG. 3.

Each of the leading angles α1 and α2 and ejection angles β1 and β2 can be a value within a range of larger than 0 degree and equal to or less than 30 degrees. Each of the leading angles α1 and α2 and ejection angles β1 and β2 can be set to an arbitrary value within the above range, and a part or all of the leading angles α1 and α2 and ejection angles β1 and β2 may be angles different from the other angles. It is preferable that each of the leading angles α1 and α2 and ejection angles β1 and β2 is set to a value of 5 degrees or more and 15 degrees or less.

The first and second conveyance rollers 441 and 442 may be disposed so that the line segment connecting the nip sections is not parallel to the first reading surface Mp1 when seen from the X direction. Similarly, the second and third conveyance rollers 442 and 443 may be disposed so that the line segment connecting the nip sections is not parallel to the second reading surface Mp2 when seen from the X direction.

The first, second and third conveyance rollers 441, 442 and 443 convey the sheet M at conveyance speeds indicated by respective setting values which are stored in the RAM 402 under the control by the control section 40. In the embodiment, the setting values according to the conveyance speeds of the first, second and third conveyance rollers 441, 442 and 443 are a same value.

Forces (hereinafter, also referred to as conveyance forces) are respectively set for the first, second and third conveyance rollers 441, 442 and 443, the forces being applied to the sheet M contacting the respective nip sections. The conveyance forces are determined according to dynamic friction coefficients between the sheet M and the surfaces of pairs of rollers (or static friction coefficients in a case where there is no slip between the surfaces of the pairs of rollers and the sheet during the conveyance), the interval between the rollers and such like. In the embodiment, the setting values according to the conveyance forces of the first, second and third conveyance rollers 441, 442 and 443 are a same value.

The first and second reading sections 431 and 432 photograph the respective portions forming the first and second reading surfaces Mp1 and Mp2 in the sheet M supported by the first and second supporting sections 451 and 452, and output two-dimensional imaging data. The first reading section 431 includes: a first light source 431L which extends in the X direction in FIG. 3 and emits light to the sheet M; and a first line sensor 431S (first light receiving section) extending in the X direction. The second reading section 432 includes: a second light source 432L which extends in the X direction and emits light to the sheet M; and a second line sensor 432S (second light receiving section) extending in the X direction. Hereinafter, the first and second light sources 431L and 432L are also merely referred to as a light source 43L, and the first and second line sensors 431S and 432S are also merely referred to as a line sensor 43S.

The light source 43L is disposed so that light emitting section for emitting light is exposed on the surface of reading section 43, the surface facing the supporting section 45.

The first light source 431L emits light from a position on the first supporting section 451 side (that is, the +Z direction side) with respect to the reference plane Dp. The second light source 432L emits light from a position on the second supporting section 452 side (that is, the −Z direction side) with respect to the reference plane Dp.

The line sensor 43S includes three arrays of imaging elements, each array including a plurality of imaging elements which are one-dimensionally arranged in the X direction. The three arrays of imaging elements receive, through color filters transmitting light of respective colors of R, G and B, the reflected light of the light emitted from the light source 43L and reflected at the sheet surface. Then, the three arrays of imaging elements output the signals corresponding to the intensities of wavelength components of R, G and B in the reflected light. As the imaging elements of the line sensor 43S, CMOS (Complementary Metal Oxide Semiconductor) sensor including photodiode as photoelectric conversion element or CCD (Charge Coupled Device) sensor can be used, for example. The line sensor 43S is disposed so that the light receiving section of the imaging element is exposed on the surface of the reading section 43, the surface facing the supporting section 45.

The first and second reading sections 431 and 432 respectively read the portions included in the reading range of a predetermined line extending in the X direction in the first and second reading surfaces Mp1 and Mp2 of the sheet M respectively supported on the first and second supporting sections 451 and 452. By alternately performing the reading and the conveyance of sheet M in the conveyance direction, the first reading section 431 reads the range including the entire back surface of the sheet M, and the second reading section 432 reads the range including the entire front surface of the sheet M. The first and second reading sections 431 and 432 convert analog signals output from the arrays of imaging elements of first and second line sensors 431S and 432S into the digital signals, generate imaging data including image data of R, G and B and output the data to the control section 40.

The first and second reading sections 431 and 432 are in shapes ensuring the space for the sheet M to change the position in ±Z direction near the both ends of the first and second reading surfaces Mp1 and Mp2.

Next, the reading operation performed by the reading apparatus 4 in the image forming system 1 having the above configuration will be described. The reading operation is executed when, for example, an image including predetermined identification marks is formed on both of the front and back surfaces of sheet M by the image forming apparatus 3 and the images on the front and back surfaces are to be read by the reading apparatus 4. Here, the predetermined identification marks include identification marks called "register marks" in a cross-shape showing the image forming position in the sheet M, for example. The reading operation to be described below is executed under the control by the control section 40 of the reading apparatus 4.

When the sheet M, which has an image formed on both the front and back surfaces by the image forming apparatus 3, is received from the image forming apparatus 3 to the reading apparatus 4, the first reading section 431 first reads the back surface of the sheet M.

The first conveyance rollers 441 convey the sheet M at a preset conveyance speed and conveyance force. Specifically, the first conveyance rollers 441 make the front surface of sheet M contact the first supporting surface 451$p$ by conveying the sheet M to the supporting surface 451$p$ from the leading direction which is at the leading angle α1 with respect to the first reading surface Mp1. The first conveyance rollers 441 continuously convey the sheet M which is contacting the first supporting surface 451$p$. Thus, the sheet M is moved along the first supporting surface 451$p$ while being forced toward the first supporting surface 451$p$. Even when warpage and waviness of sheet M are generated due to the processing in the fixing section 386, the sheet M is conveyed while forming the first reading surface Mp1 on the first supporting surface 451$p$ since the warpage and waviness are suppressed or resolved by the forcing toward the first supporting surface 451$p$. On the other hand, when the distal end of the sheet M conveyed by the first conveyance rollers 441 is guided by the guide member (not shown in the drawings) and reaches the nip section of the second conveyance rollers 442, the second conveyance rollers 442 convey the sheet M at the same conveyance speed and the same conveyance force as those of the first conveyance rollers 441, and convey the sheet M to the ejection direction, which is at the ejection angle p1 with respect to the first reading surface Mp1, to make the sheet M apart from the first supporting section 451. Subsequently, the first and second conveyance rollers 441 and 442 convey the sheet M on the first supporting surface 451$p$ while forcing the sheet M toward the supporting surface 451$p$ and forming the first reading surface Mp1 in a predetermined location range on the first supporting surface 451$p$. The first reading section 431 reads the portion forming the first reading surface Mp1 in the back surface of sheet M moving on the first supporting surface 451$p$, and outputs the imaging data to the control section 40.

By the above reading operation in the first reading section 431, reading of the back surface of sheet M is completed.

Subsequently, the second reading section 432 reads the front surface of sheet M.

The second conveyance rollers 442 convey the sheet M, which was moved away from the first supporting section 451 as described above, to the second supporting surface 452$p$ from the leading direction, which is at the leading angle α2 with respect to the second reading surface Mp2, to make the back surface of sheet M contact the second supporting surface 452$p$. The second conveyance rollers 442 continuously convey the sheet M which is contacting the second supporting surface 452$p$. Thus, the sheet M is moved along the second supporting surface 452$p$ while being forced toward the second supporting surface 452$p$, and conveyed while forming the second reading surface Mp2 on the second supporting surface 452$p$. On the other hand, when the distal end of the sheet M conveyed by the second conveyance rollers 442 is guided by the guide member (not shown in the drawings) and reaches the nip section of the third conveyance rollers 443, the third conveyance rollers 443 convey the sheet M at the same conveyance speed and the same conveyance force as those of the second conveyance rollers 442, and convey the sheet M to the ejection direction, which is at the ejection angle 132 with respect to the second reading surface Mp2, to make the sheet M apart from the second supporting section 452. Subsequently, the second and third conveyance rollers 442 and 443 convey the sheet M on the second supporting surface 452$p$ while forcing the sheet M toward the second supporting surface 452$p$ and forming the second reading surface Mp2 in a predetermined location range on the second supporting surface 452$p$. The second reading section 432 reads the portion forming the second reading surface Mp2 in the front surface of sheet M moving on the second supporting surface 452$p$, and outputs the imaging data to the control section 40.

By the above reading operation in the second reading section 432, reading of the front surface of sheet M is completed.

In a case where the sheet M has a length crossing the first and second reading sections 431 and 432, reading of the front surface of sheet M by the second reading section 432 is performed partially in parallel with the reading of back surface of sheet M by the first reading section 431.

The embodiment has been described by taking, as an example, a case where the first, second and third conveyance rollers 441, 442 and 443 convey the sheet M at the conveyance speeds indicated by the setting values. However, the conveyance speeds of the first, second and third conveyance rollers 441, 442 and 443 are changed in some cases due to variation in outer diameter, change in outer diameter caused by temperature change, and such like. Even in such case where the conveyance speeds of the first, second and third conveyance rollers 441, 442 and 443 are changed, in the image forming system 1 of the embodiment, the sheet M can be conveyed in a state in which the sheet M on the first and second supporting surfaces 451$p$ and 452$p$ is stably forming the first and second reading surfaces Mp1 and Mp2 respectively, as described below.

Figure 4A:
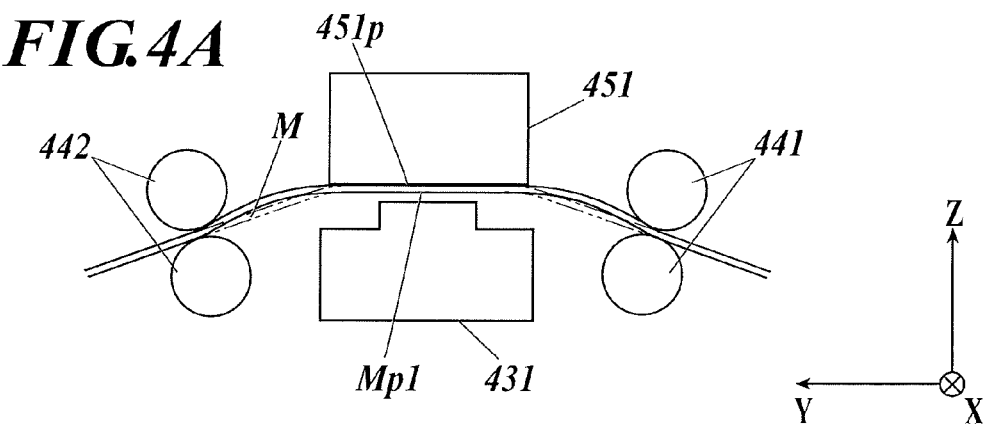
FIG. 4A is a schematic view showing a state of sheet conveyance in a case where a conveyance speed of conveyance rollers is changed.
Figure 4B:
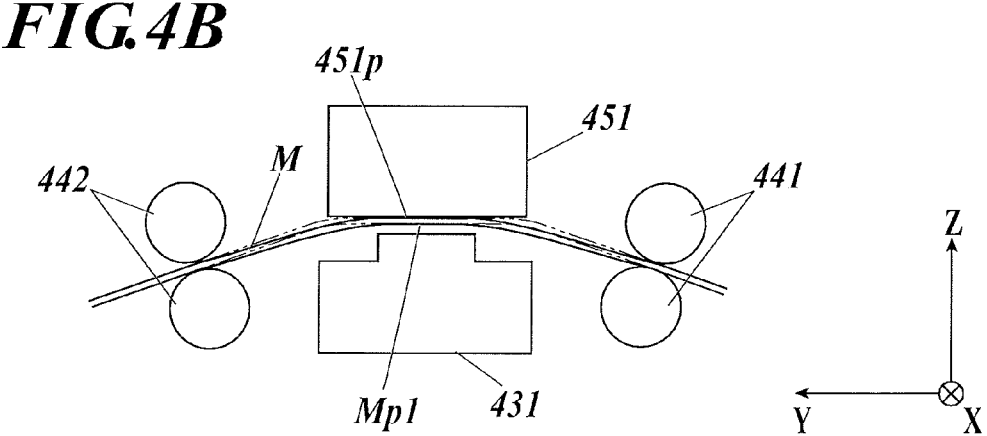
FIG. 4B is a schematic view showing a state of sheet conveyance in a case where a conveyance speed of conveyance rollers is changed.

Each of FIGS. 4A and 4B is a schematic view showing the conveyance manner of sheet M in a case where the conveyance speed of the first conveyance rollers 441 or the second conveyance rollers 442 is changed.

FIG. 4A is a schematic view showing the manner of conveyance in a case where the conveyance speed of first conveyance rollers 441 is relatively increased with respect to the conveyance speed of second conveyance rollers 442. In this case, the length of the portion of sheet M located between the nip section of first conveyance rollers 441 and the nip section of second conveyance rollers 442 is increased over time. Thus, adjacent portions of sheet M which are adjacent to the ends of first reading surface Mp1 are deformed in the $_+Z$ direction to have slacks as shown by the sold line in FIG. 4A. The slacks are caused by the configuration that the first supporting section 451, the first and second conveyance rollers 441 and 442 and first reading section 431 do not contact the adjacent portions when the shapes of the adjacent portions in the sheet M adjacent to the first reading surface Mp1 are changed in $_+Z$ direction within a predetermined range. Here, the predetermined range is a range corresponding to the maximum deformation amount (slack amount) which can be generated for a single sheet M when the conveyance speeds of first and second conveyance rollers 441 and 442 respectively become the maximum and minimum values in the possible change range. By the slacks, the difference in sheet conveyance amount per time of first and second conveyance rollers 441 and 442 is absorbed.

Even when such slack is generated near both ends of first reading surface Mp1 in the sheet M, since the sheet M is forced toward the first supporting section 451 by the first and second conveyance rollers 441 and 442, the sheet M is conveyed while forming the first reading surface Mp1 on the first supporting surface 451$p$ similarly to the case where slacks are not generated.

FIG. 4B is a schematic view showing the conveyance manner in a case where the conveyance speed of first conveyance rollers 441 is relatively decreased compared to the conveyance speed of second conveyance rollers 442. In this case, the length of the portion in sheet M located between the nip section of first conveyance rollers 441 and the nip section of second conveyance rollers 442 is decreased over time. Thus, the adjacent portions in sheet M adjacent to the ends of first reading surface Mp1 are deformed in −Z direction as shown by the solid line in FIG. 4B, resulting in the decrease of formation range in conveyance direction for forming the first reading surface Mp1. This deformation can be made by the configuration that the first supporting section 451, first and second conveyance rollers 441 and 442 and the first reading section 431 do not contact the adjacent portions when the shapes of adjacent portions in sheet M adjacent to the first reading surface Mp1 are changed in the −Z direction within a predetermined range. Here, the predetermined range is a range corresponding to the maximum deformation amount which can be generated in a single sheet M when the conveyance speeds of first and second conveyance rollers 441 and 442 respectively become the minimum and maximum values in the possible change range. Since the adjacent portions adjacent to the ends of first reading surface Mp1 in sheet M are changed in the −Z direction, the difference in sheet conveyance amount per unit time of the first and second conveyance rollers 441 and 442 is absorbed.

Even when the portions in sheet M adjacent to the ends of first reading surface Mp1 are changed in the −Z direction, since the sheet M is forced toward the first supporting section 451 by the first and second conveyance rollers 441 and 442, the sheet M is conveyed while forming the first reading surface Mp1 on the first supporting surface 451$p$ similarly to the case where the change is not generated in the −Z direction.

In such way, the first and second conveyance rollers 441 and 442 convey the sheet M by changing the shapes of portions adjacent to the first reading surface Mp1 of sheet M according to the difference between the speed of conveying the sheet M from the predetermined leading direction to the first supporting section 451 and the speed of conveying the sheet M from the first supporting section 451 to the predetermined ejection direction.

FIGS. 4A and 4B illustrate, as an example, the conveyance manner of sheet M near the first supporting section 451 in a case where the conveyance speed of first conveyance rollers 441 or the second conveyance rollers 442 is changed. However, the same is applied to the conveyance manner of sheet M near the second supporting section 452 in a case where the conveyance speed of second conveyance rollers 442 or third conveyance rollers 443 is changed. That is, the above description of FIGS. 4A and 4B can describe the conveyance manner of sheet M near the second supporting section 452 in a case where the conveyance speed of second conveyance rollers 442 or third conveyance rollers 443 is changed by replacing the first and second conveyance rollers 441 and 442, the first supporting section 451, the first reading surface Mp1 and the +Z direction (−Z direction) with the second and third conveyance rollers 442 and 443, the second supporting section 452, the second reading surface Mp2 and the −Z direction (+Z direction), for example.

When the reading apparatus 4 reads the image including the register marks as identification marks formed on both of the front and back surfaces of sheet M, in the image forming system 1, correction processing of image forming position is performed by the image forming apparatus 3 on the basis of the reading result. In the correction processing, for example, the positions in sheet M of the register marks on the front and back surfaces of sheet M are calculated from the reading result by the reading apparatus 4, the image data pixel positions of the image formed on the sheet M are shifted on the basis of the calculated positions, and thereby the image forming position by the image forming apparatus 3 (image forming section 38) is corrected.

The method of correction processing is not limited to the above method. For example, the image forming position in conveyance direction of sheet M may be corrected by changing the timing to send the sheet M to the image forming section 38 by the resist rollers 391.

Next, results of experiments which were performed for confirming the effect of the above embodiment will be described.

First, as an experiment 1, the first and second conveyance rollers 441 and 442 and the first supporting section 451 in the configuration shown in FIG. 3 conveyed the sheet M, and the change in height (position in the Z direction) based on the first supporting surface 451p of the front surface of conveyed sheet M was measured with a laser displacement meter at the reading position by the first reading section 431. The setting values according to the conveyance speeds of first and second conveyance rollers 441 and 442 were a same value, and the setting values according to the conveyance forces of first and second conveyance rollers 441 and 442 were a same value.

As a comparative experiment 1, similar measurement was performed by conveying the sheet M in a linear conveyance path.

Figure 5:
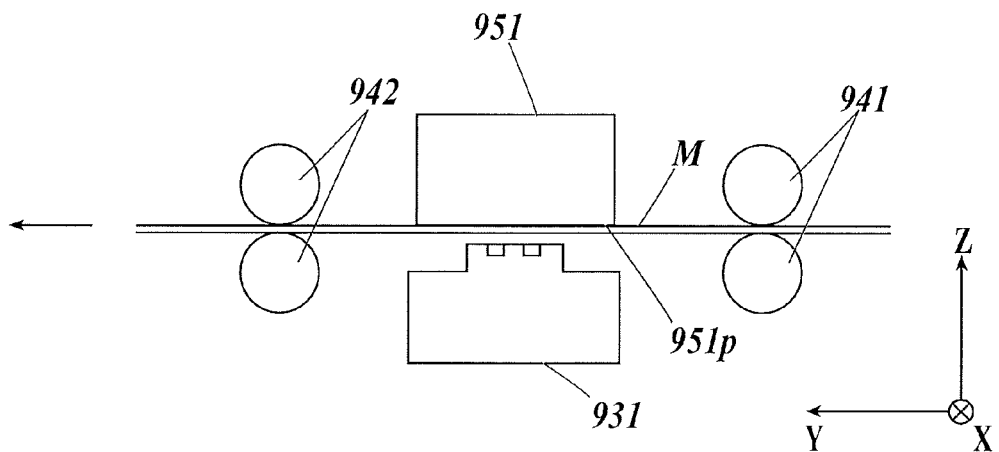
FIG. 5 is a schematic view showing the configuration of a reading section, conveyance rollers and a supporting section according to a comparative experiment 1.

FIG. 5 is a schematic view showing the configuration of reading section 931, conveyance rollers 941 and 942 and supporting section 951 according to the comparative experiment 1. As shown in FIG. 5, in the comparative experiment 1, the sheet M is conveyed linearly between the conveyance rollers 941 and the conveyance rollers 942 when seen from the X direction. In the comparative experiment 1, the change in height (position in the Z direction) based on the supporting surface 951p of front surface of the conveyed sheet M was measured with the laser displacement meter. The setting values according to the conveyance speeds of conveyance rollers 941 and 942 were a same value, and the setting values according to the conveyance forces of the conveyance rollers 941 and 942 were a same value.

The experiment 1 and the comparative experiment 1 were performed by using the sheet M which was heated and pressurized at the fixing section 386 in the image forming apparatus 3.

Figure 6A:
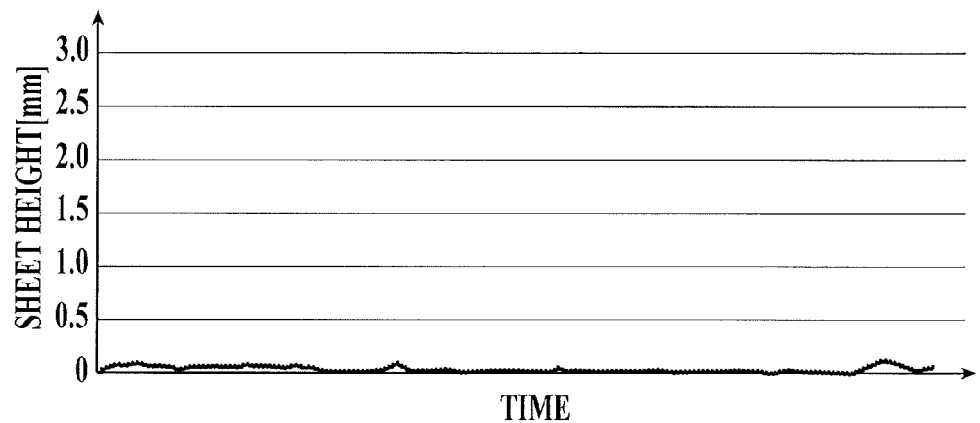
FIG. 6A is a view showing a measurement result of change in sheet height in an experiment 1.
Figure 6B:
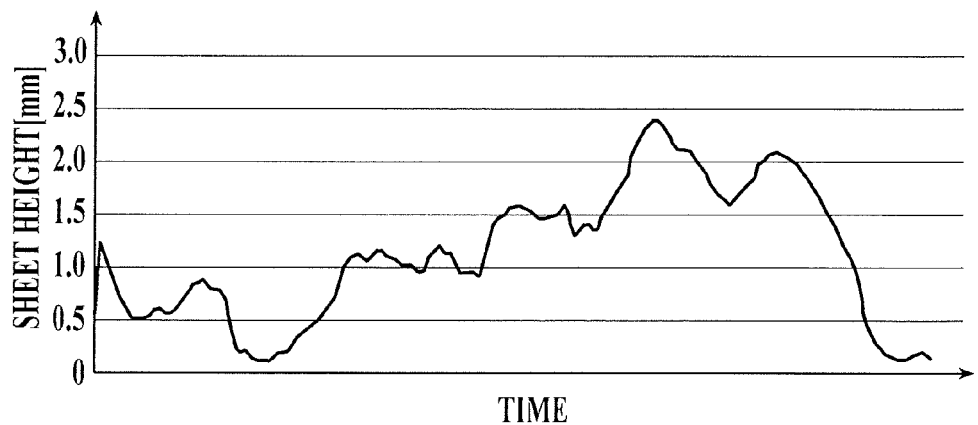
FIG. 6B is a view showing a measurement result of change in sheet height in the comparative experiment 1.

FIG. 6A is a view showing a measurement result of height change of sheet M in the experiment 1, and FIG. 6B is a view showing a measurement result of height change of sheet M in the comparative experiment 1. FIGS. 6A and 6B use the horizontal axis (time) and longitudinal axis (height of sheet M) having the same unit and scale. The height of sheet M shown in FIGS. 6A and 6B is a distance between the surface of sheet M and the first supporting surface 451p and supporting surface 951p respectively, and thus, not affected by the thickness of sheet. The position where the height of sheet M is 0 is the position where the surface of sheet M tightly contacts the first supporting surface 451p or supporting surface 951p.

As shown in FIGS. 6A and 6B, the maximum value of height of sheet M in the experiment 1 was one tenth or less of the maximum value of height of sheet M in the comparative experiment 1.

In such way, it was found that, in the configuration of comparative experiment 1 of linearly conveying the sheet M, the height of sheet M M largely changes reflecting the warpage and waviness of sheet M caused by heating and pressurizing at the fixing section 386. On the other hand, in the configuration of experiment 1, it was found that the change in height of sheet M is largely suppressed compared to the configuration of comparative experiment 1 by suppressing the warpage and waviness since the sheet M is conveyed while being forced toward the first supporting surface 451p by contacting the first supporting surface 451p from the predetermined leading direction and being conveyed to the predetermined ejection direction to be apart from the first supporting surface 451p.

From the result, as for the suppressing effect of height change of sheet Mat the reading position by the first reading section 431, it was confirmed that the configuration of experiment 1 conveying the sheet M on the conveyance path shown in FIG. 3 is excellent compared to the configuration of comparative experiment 1 conveying the sheet M on the linear conveyance path.

Next, as the experiment 2, the sheet M was conveyed in the same configuration as the configuration of experiment 1, and the change rate of speed of sheet M at the reading position by the first reading section 431 was measured by a laser Doppler velocimeter. In the experiment 2, similarly to the experiment 1, the first and second conveyance rollers 441 and 442 have a same setting value according to the conveyance speed, and the first and second conveyance rollers 441 and 442 have a same setting value according to the conveyance force.

In the comparative experiment 2, the speed change rate of sheet M at the reading position by first reading section 431 was measured by making the setting value according to conveyance speed of second conveyance rollers 442 be larger than the setting value according to conveyance speed of first conveyance rollers 441 and making the setting value according to conveyance force of second conveyance rollers 442 smaller than the setting value according to conveyance force of first conveyance rollers 441 in the configuration of experiment 2. That is, in the comparative experiment 2, the conveyance speed of second conveyance rollers 442 downstream in the conveyance direction is relatively large and the conveyance force is relatively small so as not to generate slacks of sheet M caused by the change in conveyance speed of the first and second conveyance rollers 441 and 442.

In the experiment 2 and the comparative experiment 2, sheet M which was heated and pressurized at the fixing section 386 in the image forming apparatus 3 was used.

FIG. 7A is a view showing the measurement result of speed change rate of sheet M in the experiment 2, and FIG. 7B is a view showing the measurement result of speed change rate of sheet M in the comparative experiment 2. FIGS. 7A and 7B use the horizontal axis (time) and longitudinal axis (speed change rate of sheet M) having the same unit and scale.

As shown in FIG. 7B, in the comparative experiment 2, it was found that the sheet speed is not stable due to stick-slip phenomenon caused by slip at least between the nip section of second conveyance rollers 442 and the sheet M since the conveyance speed of second conveyance rollers 442 downstream in the conveyance direction is relatively large and the conveyance force is relatively small. On the other hand, as shown in FIG. 7A, in the experiment 2, it was found that the speed of sheet M at the reading position by first reading section 431 is stable compared to that of comparative experiment 2 due to the slip being not easily generated between the sheet M and the nip section since both of the conveyance speeds and conveyance forces of the first and second conveyance rollers 441 and 442 are set to be equal to each other.

From this result, as for the suppressing effect of speed change of sheet M at the reading position by first reading section 431, it was confirmed that the configuration of experiment 2 having the same conveyance speeds and conveyance forces of first and second conveyance rollers 441 and 442 is excellent compared to the comparative experiment 2 making the conveyance speed of second conveyance rollers 442 downstream in conveyance direction be relatively large and making the conveyance force be relatively small.

As described above, the reading apparatus 4 in the embodiment includes: a first supporting section 451 which is connected to the image forming apparatus 3 for forming an image on the sheet M, and forms a first reading surface Mp1 for reading the image on the sheet M by contacting the sheet M having the image formed thereon by the image forming apparatus 3; a conveyance section 44 which conveys the sheet M so that the sheet M contacts the first supporting section 451 from the leading direction at the leading angle α1 with respect to the first reading surface Mp1, and moves apart from the first supporting section 451 to the ejection direction at the ejection angle 131 with respect to the first reading surface Mp1; and a first reading section 431 which reads the image on the sheet M at the position where the first reading surface Mp1 is formed. By such configuration, the sheet M is conveyed while being forced toward the first supporting section 451 by contacting the first supporting section 451 from the leading direction and moving to the ejection direction from the first supporting section 451 to be apart from the first supporting section 451. Thus, warpage and waviness generated by image formation by the image forming apparatus 3 is suppressed at the portion forming the first reading surface Mp1 in the sheet M. Thus, it is possible to suppress the height change of sheet M at the reading position by the first reading section 431 and improve the reading accuracy by the first reading section 431.

The first reading section 431 reads the surface of sheet M opposite to the surface contacting the first supporting section 451. By such configuration, since the first supporting section 451 does not intervene between the first reading section 431 and the sheet M, it is possible to improve the image quality of reading result by the first reading section 431. Since the surface of sheet M read by the first reading section 431 does not contact the first supporting section 451, it is possible to suppress the trouble of blot of the first supporting section 451 caused by the color material attached to the sheet M.

The conveyance section 44 includes: first conveyance rollers 441 which convey the sheet M from the leading direction to the first supporting section 451; and second conveyance rollers 442 which convey the sheet M from the first supporting section 451 to the ejection direction. The setting value of conveyance speed of sheet M according to the first conveyance rollers 441 is equal to the setting value of conveyance speed of sheet M according to the second conveyance rollers 442. The setting value of conveyance force acting on sheet M according to the first conveyance rollers 441 is equal to the setting value of conveyance force acting on the sheet M according to the second conveyance rollers 442. As a result, the sheet M can be conveyed in a state in which there is little or no slip between the first and second conveyance rollers 441 and 442 and the sheet M. Thus, the speed change of sheet M generated at the reading position by the first reading section 431 can be suppressed. Even in such configuration, the sheet M is conveyed while being forced toward the first supporting section 451 by contacting the first supporting surface 451p from the leading direction and moving to the ejection direction to be apart from the first supporting surface 451p . Thus, the warpage and waviness generated by image formation by the image forming apparatus 3 is suppressed at the portion of sheet M forming the first reading surface Mp1.

Therefore, it is possible to suppress both of the height change and speed change of sheet M at the reading position by the first reading section 431. Thus, the reading accuracy by first reading section 431 can be improved.

The supporting section 45 includes: a first supporting section 451 which supports one surface of the sheet M; and a second supporting section 452 which is disposed downstream in conveyance direction of sheet M by conveyance section 44 with respect to the first supporting section 451, and supports the other surface of sheet M. The reading section 43 includes: a first reading section 431 which reads the other surface of sheet M supported by the first supporting section 451; and a second reading section 432 which reads the one surface of sheet M supported by the second supporting section 452. The conveyance section 44 includes: first conveyance rollers 441 which convey the sheet M from the first leading direction to the first supporting section 451; second conveyance rollers 442 which convey the sheet M from the first supporting section 451 to the first ejection direction, and convey the sheet M from the second leading direction to the second supporting section 452; and third conveyance rollers 443 which convey the sheet M from the second supporting section 452 to the second ejection direction. Thus, both of front and back surfaces of sheet M can be read by the first and second reading sections 431 and 432. Since the height change of sheet M is suppressed at the reading positions by the first and second reading sections 431 and 432, the reading accuracy of front and back surfaces of sheet M by the first and second reading sections 431 and 432 can be improved. Since the second conveyance rollers 442 perform both of conveyance of sheet M from the first supporting section 451 to the first ejection direction and conveyance of sheet M from the second leading direction to the second supporting section 452, the sheet M can be conveyed with the above effects by the minimum configuration of conveyance section 44.

The first, second and third conveyance rollers 441, 442 and 443 have the same setting value of conveyance speed of sheet M, and have the same setting value of conveyance force acting on sheet M. As a result, the sheet M can be conveyed in a state in which there is little or no slip between the first, second and third conveyance rollers 441, 442 and 443 and the sheet M. Thus, the speed change of sheet M generated at the reading positions by the first and second reading sections 431 and 432 can be suppressed. Even in such configuration, the sheet M is conveyed while being forced toward the first and second supporting sections 451 and 452 by contacting the first and second supporting surfaces 451p and 452p from the respective leading directions and moving to the ejection directions to be apart from the first and second supporting surfaces 451p and 452p, respectively. Thus, the warpage and waviness generated by image formation by the image forming apparatus 3 are suppressed at the portions of sheet M forming the first and second reading surfaces Mp1 and Mp2. Thus, both of the height change and speed change of sheet M at the reading positions by the first and second reading sections 431 and 432 can be suppressed. Thus, the reading accuracy by the first and second reading sections 431 and 432 can be improved.

The first reading section 431 includes: a first light source 431L which emits light to the other surface of sheet M supported by the first supporting section 451; and a first line sensor 431S which receives reflected light reflected at the sheet M after emitted from the first light source 431L. The second reading section 432 includes: a second light source 432L which emits light to the one surface of sheet M supported by the second supporting section 452; and a second line sensor 432S which receives reflected light reflected at the sheet M after emitted from the second light source 432L. The first supporting section 451 and the second supporting section 452 are disposed so as to be opposite to each other with respect to the reference plane Dp parallel to the first reading surface Mp1 according to the first supporting section 451 and the second reading surface Mp2 according to the second supporting section 452. The first light source 431L emits light from the first supporting section 451 side with respect to the reference plane Dp and the second light source 432L emits light from the second supporting section 452 side with respect to the reference plane Dp. By such configuration, it is possible to prevent the light which was emitted from the first light source 431L from directly entering the second line sensor 432S and prevent the light which was emitted from the second light source 432L from directly entering the first line sensor 431S. Thus, it is possible to prevent troubles such as contrast decrease caused by the light from second and first light sources 432L and 431L respectively in the reading results of first and second reading sections 431 and 432. By the above configuration, the location range of first and second reading sections 431 and 432 can be reduced in the direction orthogonal to the reference plane Dp, and thus, the reading apparatus 4 can be configured to be compact.

The image forming system 1 according to the embodiment includes: an image forming apparatus 3 which forms an image on the sheet M; and a reading apparatus 4 which reads the image formed on the sheet M. The reading apparatus 4 includes: a first supporting section 451 which contacts the sheet M having the image formed thereon by the image forming apparatus 3 and forms the first reading surface Mp1 for reading the image on the sheet M; a conveyance section 44 which conveys the sheet M so that the sheet M contacts the supporting section 451 from the leading direction at the leading angle α1 with respect to the first reading surface Mp1, and moves apart from the supporting section 451 to the ejection direction at the ejection angle β2 with respect to the first reading surface Mp1; and a first reading section 431 which reads the image on the sheet M at the position where the first reading surface Mp1 is formed. By such configuration, the height change of sheet M at the reading position of first reading section 431 can be suppressed, and the reading accuracy by the first reading section 431 can be improved.

(Modification Example)

Next, a modification example of the embodiment will be described.

In the modification example, the configuration of reading apparatus 4 in the image forming system 1 according to the embodiment is included in the image forming apparatus 3. The modification example is similar to the embodiment in the other respects.

Figure 8:
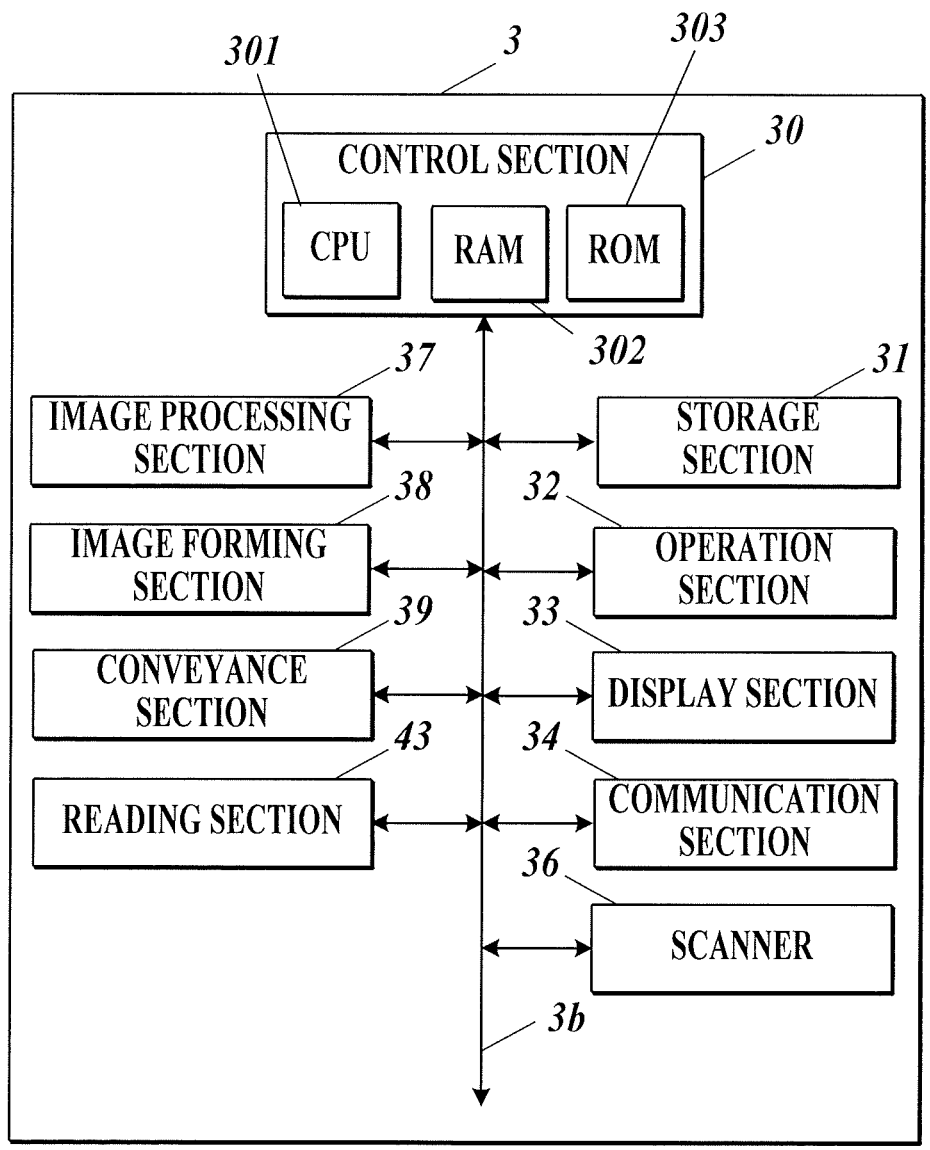
FIG. 8 is a block diagram showing a main functional configuration of an image forming apparatus according to a modification example.

FIG. 8 is a block diagram showing the main functional configuration of image forming apparatus 3 according to the modification example.

The image forming apparatus 3 in the modification example includes: a control section 30 which has a CPU 301, a RAM 302 and a ROM 303; a storage section 31; an operation section 32; a display section 33; a communication section 34; a scanner 36; an image processing section 37; an image forming section 38; a conveyance section 39; and a reading section 43. These components have same configurations and functions as the components provided with the same reference numerals in the embodiment, and thus, the detailed description is omitted. In addition to the configurations and functions in the embodiment, the control section 30, storage section 31 and conveyance section 39 respectively have the configurations and functions of control section 40, storage section 42 and conveyance section 44 of reading apparatus 4 in the embodiment.

In the modification example, reading operation of front surface and back surface of sheet M by the reading apparatus 4 described in the embodiment is performed in the image forming apparatus 3 under control by the control section 30 of the image forming apparatus 3.

Only a partial configuration of the reading apparatus 4 may be included in the image forming apparatus 3. For example, only the configuration and function of control section 40 in the reading apparatus 4 may be included in the control section 30 of image forming apparatus 3, and the reading operation of sheet M by the reading apparatus 4 may be performed under control by the control section 30 of image forming apparatus 3.

As described above, the image forming apparatus 3 according to the modification example includes: an image forming section 38 which forms an image on the sheet M; a first supporting section 451 which contacts the sheet M having the image formed thereon by the image forming apparatus 3 and forms the first reading surface Mp1 for reading the image on the sheet M; a conveyance section 44 which conveys the sheet M so that the sheet M contacts the supporting section 451 from the leading direction at the leading angle α1 with respect to the first reading surface Mp1 and moves apart from the supporting section 451 to the ejection direction at the ejection angle β2 with respect to the first reading surface Mp1; and a first reading section 431 which reads the image on the sheet M at the position where the first reading surface Mp1 is formed. By such configuration, reading of sheet M can be performed in the image forming apparatus 3. Also, the height change of sheet M can be suppressed at the reading position by first reading section 431, and the reading accuracy by the first reading section 431 can be improved.

The present invention is not limited to the above embodiment and modification example, and various changes can be made.

For example, the embodiment and modification examples have been described by taking, as an example, a case where the reading apparatus 4 reads the front and back surfaces of sheet M with the first and second reading sections 431 and 432; however, the present invention is not limited to this. For example, the reading apparatus 4 may have a configuration of including the first reading section 431, first and second conveyance rollers 441 and 442 and first supporting section 451 shown in FIG. 3, and not including the second reading section 432, third conveyance rollers 443 and second supporting section 452 so that the first reading section 431 reads only one surface of sheet M.

The embodiment and modification example have been described by taking, as an example, the configuration in which the second conveyance rollers 442 convey the sheet M from the first supporting section 451 to the predetermined ejection direction and make the sheet M contact the second supporting section 452 from the predetermined leading direction; however, the present invention is not limited to this. For example, conveyance rollers may be disposed upstream and downstream in conveyance direction of the first reading section 431 and may be also disposed upstream and downstream in conveyance direction of the second reading section 432.

The embodiment and modification example have been described by taking, as an example, a case where the first and second supporting surfaces 451$p$ and 452$p$ of the first and second supporting sections 451 and 452 are flat surfaces and the first and second reading surfaces Mp1 and Mp2 of the sheet M are also flat surfaces; however, the present invention is not limited to this. For example, the first and second supporting sections 451 and 452 may support the sheet M on curved surfaces. The first and second supporting sections 451 and 452 may have any configurations as long as they have mechanisms for supporting the sheet M so that the sheet M can form reading surfaces within a predetermined range. For example, the first and second supporting sections 451 and 452 may include a plurality of projections and support the sheet M at the tops of the projections. In this case, the reading surface is formed by a flat surface obtained by connecting the tops of the projections. The first and second supporting sections 451 and 452 may support the sheet M by a combination of a flat or curved surface and other supporting bodies such as the above projections and rollers. In such configuration, the sheet M can slide on the supporting section more smoothly since the contacting area between each of the first and second supporting sections 451 and 452 and the sheet M is reduced.

The first and second reading surfaces Mp1 and Mp2 formed by the sheet M may not be flat surfaces, and may be curved surfaces. In a case where the first and second reading surfaces Mp1 and Mp2 are curved surfaces, the reference plane Dp is a plane orthogonal to a normal line of at least a part of the first and second reading surfaces Mp1 and Mp2. That is, the reference plane Dp is set so that a plane parallel to the reference plane Dp is a tangent plane at a position of the first and second reading surfaces Mp1 and Mp2.

The embodiment and modification example have been described by taking, as an example, a case where register marks as identification marks formed on the sheet M are read to correct the image forming position. However, instead of this process, correction processing of increasing and decreasing the image formation width in the conveyance direction of sheet M and/or the width direction orthogonal to the conveyance direction may be performed.

The identification marks are not limited to the above register marks for showing the image forming position. The identification marks may be reference marks showing trimming positions and margins of sheet M, marks showing a specific part in the image formed on the sheet M, a test chart for inspecting the color and image quality of the image formed by the image forming apparatus 3, or such like.

The reading may be performed in a manner that an image not including identification marks is formed on the sheet M by the image forming apparatus 3 and the reading apparatus 4 reads the image.

The embodiment and modification example have been described by taking, as an example, a case where the reading section 43 includes the line sensor 43S which detects, with imaging elements, intensities of light that entered via color filters transmitting the light of R, G and B colors. However, the configuration of reading section is not limited to this. For example, the reading section may include light sources which respectively emit light of R, G and B colors, and imaging elements which respectively receive reflected light at sheet M of light of R, G and B colors and detect intensities.

The embodiment and modification example have been described by taking, as an example, electrophotographic image forming apparatus 3; however, the type of image forming apparatus 3 is not limited to this. For example, the image forming apparatus 3 may be an ink jet type image forming apparatus which ejects ink (color material) from a recording head to the recording medium conveyed by a conveyance apparatus, and solidifies the ejected ink to form an image.

Though the sheet M of flat paper which is cut by a predetermined length has been described as an example of recording medium, instead of this, continuous paper (roll paper), which is wound off from a roll and rewound by another roll, may be used as the recording medium. As the recording medium, various media such as fabric or sheet-like resin can be used in addition to paper, the media capable of fixing a color material such as toner and ink to the surface.

Though several embodiments of the present invention have been described above, the scope of the present invention is not limited to the above embodiments, and includes the scope of inventions, which is described in the scope of claims, and the scope equivalent thereof.

The entire disclosure of Japanese Patent Application No. 2015-064225 filed on Mar. 26, 2015 including description, claims, drawings, and abstract are incorporated herein by reference in its entirety.

What is claimed is:

1. A reading apparatus configured to be connected to an image forming apparatus that forms an image on a recording medium, the reading apparatus comprising:
   a supporting section configured to form a reading surface for reading the image on the recording medium by contacting the recording medium on which the image is formed by the image forming apparatus;
   a conveyance section configured to convey the recording medium so that the recording medium contacts the supporting section from a leading direction at a predetermined leading angle with respect to the reading surface and moves apart from the supporting section to an ejection direction at a predetermined ejection angle with respect to the reading surface; and
   a reading section configured to read the image on the recording medium at a position where the reading surface is formed,
   wherein the supporting section includes:
   a first supporting section having a first supporting surface configured to support one surface of the recording medium; and
   a second supporting section disposed on a downstream side of the first supporting section in a conveyance direction of the recording medium by the conveyance section and having a second supporting surface configured to support an other surface of the recording medium,
   the reading section includes:
   a first reading section configured to read the other surface of the recording medium, the recording medium being supported by the first supporting section; and
   a second reading section configured to read the one surface of the recording medium, the recording medium being supported by the second supporting section, and
   wherein the first reading section includes a first light source and the second reading section includes a second light source,
   the first light source being disposed to emit light from the first supporting section side with respect to a reference plane,
   the second light source being disposed to emit light from the second supporting section side with respect to the reference plane,
   a direction of the light from the first source and a direction of the light from the second source being opposite to each other,
   wherein the first supporting surface of the first supporting section is disposed on the one side with respect to the reference plane, and the second supporting surface of the second supporting section is disposed on the other side with respect to the reference plane; and wherein the first supporting surface of the first supporting section is disposed on a +Z direction side of the reference plane, and the second supporting surface of the second supporting section is disposed on a −Z direction side of the reference plane, the Z direction being perpendicular to the reference plane.

2. The reading apparatus of claim 1, wherein the reading section is configured to read a surface of the recording medium, the surface being opposite to a surface which is in contact with the supporting section.

3. The reading apparatus of claim 1, wherein the conveyance section includes: a first conveyance roller configured to convey the recoding medium to the supporting section from the leading direction; and a second conveyance roller configured to convey the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

4. The reading apparatus of claim 1, wherein the conveyance section includes: a first conveyance roller configured to convey the recording medium to the first supporting section from a first leading direction; a second conveyance roller configured to convey the recording medium from the first supporting section to a first ejection direction and conveys to convey the recording medium to the second supporting section from a second leading direction; and a third conveyance roller configured to convey the recording medium from the second supporting section to a second ejection direction.

5. The reading apparatus of claim 4, wherein setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

6. The reading apparatus of claim 4, wherein the first reading section includes: a first light receiving section configured to receive reflected light at the recording medium of light emitted from the first light source, the second reading section includes: a second light receiving section configured to receive reflected light at the recording medium of light emitted from the second light source, and the reference plane is parallel to a first reading surface according to the first supporting section and parallel to a second reading surface according to the second supporting section.

7. An image forming apparatus, comprising:
an image forming section configured to form an image on a recording medium;
a supporting section configured to form a reading surface for reading the image on the recording medium by contacting the recording medium on which the image is formed by the image forming section;
a conveyance section configured to convey the recording medium so that the recording medium contacts the supporting section from a leading direction at a predetermined leading angle with respect to the reading surface and moves apart from the supporting section to an ejection direction at a predetermined ejection angle with respect to the reading surface; and
a reading section configured to read the image on the recording medium at a position where the reading surface is formed,
wherein the supporting section includes:
a first supporting section having a first supporting surface configured to support one surface of the recording medium; and
a second supporting section disposed on a downstream side of the first supporting section in a conveyance direction of the recording medium by the conveyance section and having a second supporting surface configured to support an other surface of the recording medium,
the reading section includes:
a first reading section configured to read the other surface of the recording medium, the recording medium being supported by the first supporting section; and
a second reading section configured to read the one surface of the recording medium, the recording medium being supported by the second supporting section, and
wherein the first reading section includes a first light source and the second reading section includes a second light source,
the first light source being disposed to emit light from the first supporting section side with respect to a reference plane,
the second light source being disposed to emit light from the second supporting section side with respect to the reference plane,
a direction of the light from the first source and a direction of the light from the second source being opposite to each other,
wherein the first supporting surface of the first supporting section is disposed on the one side with respect to the reference plane, and the second supporting surface of the second supporting section is disposed on the other side with respect to the reference plane; and
wherein the first supporting surface of the first supporting section is disposed on a +Z direction side of the reference plane, and the second supporting surface of the second supporting section is disposed on a −Z direction side of the reference plane, the Z direction being perpendicular to the reference plane.

8. The image forming apparatus of claim 7, wherein the reading section is configured to read a surface of the recording medium, the surface being opposite to a surface which is in contact with the supporting section.

9. The image forming apparatus of claim 7, wherein the conveyance section includes: a first conveyance roller configured to convey the recoding medium to the supporting section from the leading direction; and a second conveyance roller configured to convey the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

10. The image forming apparatus of claim 7, wherein the conveyance section includes: a first conveyance roller configured to convey the recording medium to the first supporting section from a first leading direction; a second conveyance roller configured to convey the recording medium from the first supporting section to a first ejection direction and conveys to convey the recording medium to the second supporting section from a second leading direction; and a third conveyance roller configured to convey the recording medium from the second supporting section to a second ejection direction.

11. The image forming apparatus of claim 10, wherein setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

12. The image forming apparatus of claim 10, wherein the first reading section includes: a first light receiving section configured to receive reflected light at the recording medium of light emitted from the first light source, the second reading section includes: a second light receiving section configured to receive reflected light at the recording medium of light emitted from the second light source, and the reference plane is parallel to a first reading surface according to the first supporting section and parallel to a second reading surface according to the second supporting section.

13. An image forming system, comprising:
an image forming apparatus configured to form an image on a recording medium; and
a reading apparatus configured to read the image formed on the recording medium, wherein the reading apparatus includes:
a supporting section configured to form a reading surface for reading the image on the recording medium by contacting the recording medium on which the image is formed by the image forming apparatus;
a conveyance section configured to convey the recording medium so that the recording medium contacts the supporting section from a leading direction at a predetermined leading angle with respect to the reading surface and moves apart from the supporting section to an ejection direction at a predetermined ejection angle with respect to the reading surface; and
a reading section configured to read the image on the recording medium at a position where the reading surface is formed,
wherein the supporting section includes:
a first supporting section having a first supporting surface configured to support one surface of the recording medium; and
a second supporting section disposed on a downstream side of the first supporting section in a conveyance direction of the recording medium by the conveyance section and having a second supporting surface configured to support an other surface of the recording medium,
the reading section includes:
a first reading section configured to read the other surface of the recording medium, the recording medium being supported by the first supporting section; and
a second reading section configured to read the one surface of the recording medium, the recording medium being supported by the second supporting section, and
wherein the first reading section includes a first light source and the second reading section includes a second light source, the first light source being disposed to emit light from the first supporting section side with respect to a reference plane,
the second light source being disposed to emit light from the second supporting section side with respect to the reference plane,
a direction of the light from the first source and a direction of the light from the second source being opposite to each other,
wherein the first supporting surface of the first supporting section is disposed on the one side with respect to the reference plane, and the second supporting surface of the second supporting section is disposed on the other side with respect to the reference plane; and
wherein the first supporting surface of the first supporting section is disposed on a +Z direction side of the reference plane, and the second supporting surface of the second supporting section is disposed on a −Z direction side of the reference plane, the Z direction being perpendicular to the reference plane.

14. The image forming system of claim 13, wherein the reading section is configured to read a surface of the recording medium, the surface being opposite to a surface which is in contact with the supporting section.

15. The image forming system of claim 13, wherein the conveyance section includes: a first conveyance roller configured to convey the recoding medium to the supporting section from the leading direction; and a second conveyance roller configured to convey the recording medium from the supporting section to the ejection direction, and a setting value of a conveyance speed of the recording medium according to the first conveyance roller is equal to a setting value of a conveyance speed of the recording medium according to the second conveyance roller, and a setting value of a conveyance force acting on the recording medium according to the first conveyance roller is equal to a setting value of a conveyance force acting on the recording medium according to the second conveyance roller.

16. The image forming system of claim 13, wherein the conveyance section includes: a first conveyance roller configured to convey the recording medium to the first supporting section from a first leading direction; a second conveyance roller configured to convey the recording medium from the first supporting section to a first ejection direction and conveys to convey the recording medium to the second supporting section from a second leading direction; and a third conveyance roller configured to convey the recording medium from the second supporting section to a second ejection direction.

17. The image forming system of claim 16, wherein setting values of conveyance speeds of the recording medium according to the first conveyance roller, the second conveyance roller and the third conveyance roller are equal to each other, and setting values of conveyance forces acting on the recording medium according to the first conveyance roller, the second conveyance roller and the third conveyance roller are equal to each other.

18. The image forming system of claim 16, wherein the first reading section includes: a first light receiving section configured to receive reflected light at the recording medium of light emitted from the first light source, the second reading section includes: a second light receiving section configured to receive reflected light at the recording medium of light emitted from the second light source, and the reference plane is parallel to a first reading surface according to the first supporting section and parallel to a second reading surface according to the second supporting section.

19. A reading apparatus configured to be connected to an image forming apparatus that forms an image on a recording medium, the reading apparatus comprising:

a supporting section configured to form a reading surface for reading the image on the recording medium by contacting the recording medium on which the image is formed by the image forming apparatus;

a conveyance section configured to convey the recording medium so that the recording medium contacts the supporting section from a leading direction at a predetermined leading angle with respect to the reading surface and moves apart from the supporting section to an ejection direction at a predetermined ejection angle with respect to the reading surface; and a reading section configured to read the image on the recording medium at a position where the reading surface is formed, wherein the reading surface is a flat surface, and the leading direction is a direction which is inclined toward the reading section side with respect to the reading surface, and at the position where the reading surface is formed, the recording medium solely contacts the supporting section, wherein the supporting section includes:

a first supporting section configured to support one surface of the recording medium; and a second supporting section disposed on a downstream side of the first supporting section in a conveyance direction of the recording medium by the conveyance section and configured to support an other surface of the recording medium, and wherein the conveyance section includes:

a first conveyance roller configured to convey the recording medium to the first supporting section from a first leading direction;

a second conveyance roller configured to convey the recording medium from the first supporting section to a first election direction and to convey the recording medium to the second supporting section from a second leading direction; and a third conveyance roller configured to convey the recording medium from the second supporting section to a second election direction; and wherein the first supporting surface of the first supporting section is disposed on a +Z direction side of a reference plane, and the second supporting surface of the second supporting section is disposed on a −Z direction side of the reference plane, the Z direction being perpendicular to the reference plane.

* * * * *